United States Patent [19]
Scott et al.

[11] 3,935,942
[45] Feb. 3, 1976

[54] PACKAGE CONVEYOR METHOD AND APPARATUS

[75] Inventors: John W. Scott, Loma Linda, Calif.; Alan P. Hosie, Mississauga, Canada

[73] Assignee: The Garrett Corporation, Los Angeles, Calif.

[22] Filed: May 22, 1975

[21] Appl. No.: 583,823

Related U.S. Application Data
[63] Continuation of Ser. No. 448,178, March 4, 1974, abandoned.

[52] U.S. Cl. ............................... 198/157; 198/158
[51] Int. Cl.² ........................................ B65G 17/00
[58] Field of Search ............ 198/154, 156, 157, 158

[56] References Cited
UNITED STATES PATENTS

| | | | |
|---|---|---|---|
| 1,269,588 | 6/1918 | Erdman | 198/157 |
| 3,268,061 | 8/1966 | De Good et al. | 198/154 |
| 3,575,281 | 4/1971 | Sutton | 198/158 |

Primary Examiner—John J. Love
Assistant Examiner—Joseph E. Valenza
Attorney, Agent, or Firm—Alfons Valukonis; Alan E. Kopecki; Albert J. Miller

[57] ABSTRACT

Conveyor method and apparatus wherein there is provided a package carrying tray, a pair of endless control chains, a pair of endless load chains, and a motor and sprocket wheel-drive arrangement for rotating the chains in synchronism. The tray is so connected to points on the chains that the tray is maintained in substantially horizontal and vertical positions during portions of tray movement from and to package loading and unloading areas while compensating for changes in spacing between the points during movement from one position to the other. The connection involves providing a pair of pins each on an opposite side of one end of the tray, with each of the load chains secured to a pin at a point for pivotal movement. A pair of control arms are each secured to a pin at its end, and have a slide thereon which is fastened to a point on one of the control chains for pivotal movement. Fork assemblies, cooperable with the tray, provide for the loading and unloading of packages at designated stations.

9 Claims, 16 Drawing Figures

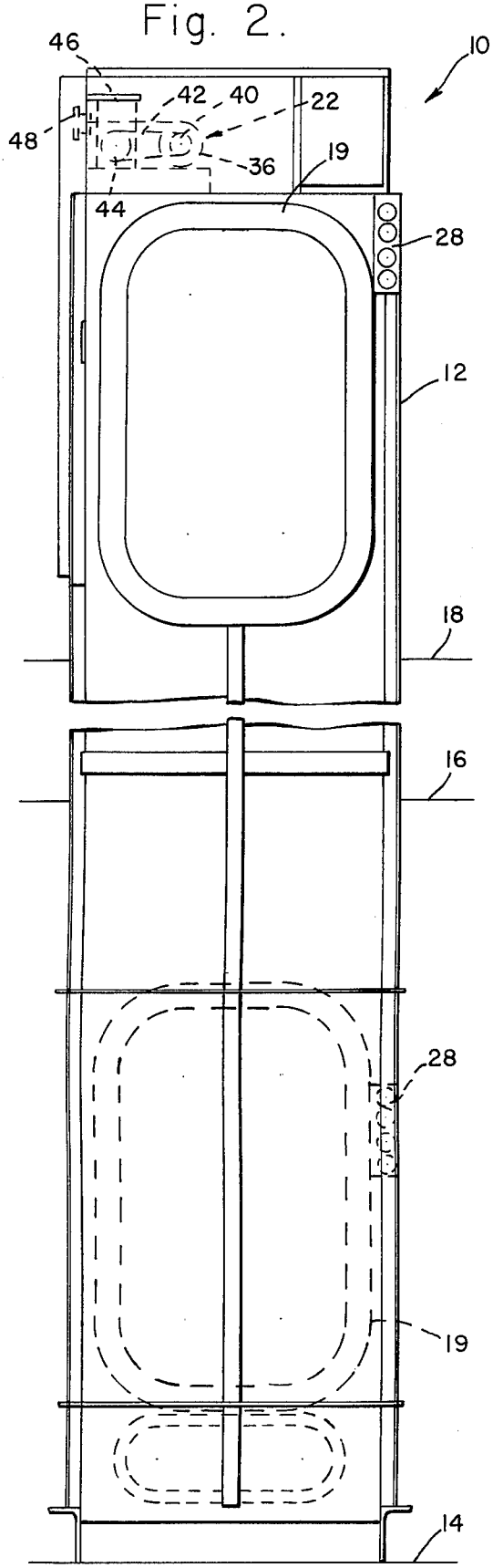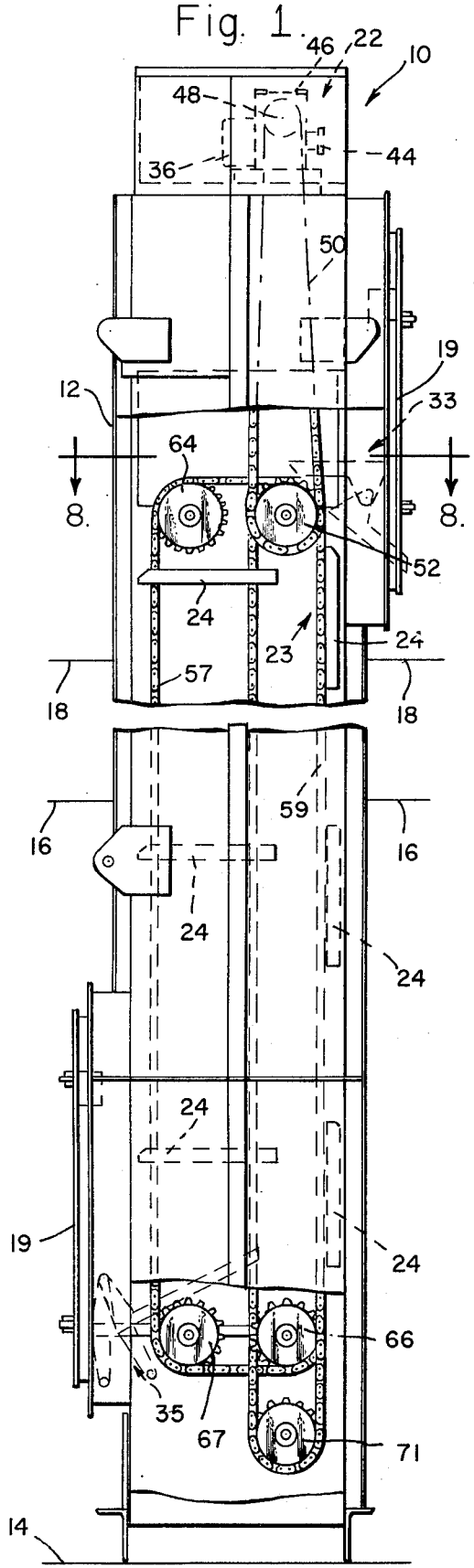

PACKAGE CONVEYOR METHOD AND APPARATUS

This is a continuation of application Ser. No. 448,178 filed Mar. 4, 1974, now abandoned.

BACKGROUND OF THE INVENTION

This invention relates generally to package conveying method and apparatus, and more particularly to package conveying method and apparatus employing chain suspended trays for transporting cargo as between ship deck levels, or between floors of a building.

Present elevator systems, particularly those provided with tray chain suspension and control tracks for shipboard applications, frequently suffer from distortion, misalignment, and thus possible jamming. Distortion of the elevator casing or misalignment of upper or lower chain sprockets can prevent free movement of cargo trays carried by the chains of such elevator systems. Also, jamming is apt to occur at upper and lower levels when cargo trays carried by the chains change travel direction.

Examples of prior art elevator systems are U.S. Pat. No. 3,184,039 to Czarnecki; U.S. Pat. No. 1,461,638 to Wells et al; and U.S. Pat. No. 1,856,262 to Rebstock.

SUMMARY OF THE INVENTION

Package conveyor method and apparatus providing a casing, package carrying trays, pairs of spaced endless control and load chains, drive means interconnecting the control and load chains, and means connecting the trays to points on the chains for maintaining the trays substantially in a normal position with respect to the chains during a portion of tray travel and in a substantially parallel position with respect to the chains during another portion of tray travel, and for compensating for changes in spacing between the points during tray travel portions when the trays translate from one position to the other position.

BRIEF DESCRIPTION OF THE DRAWINGS

FIG. 1 is a side elevation view, partially cut away, of the conveyor of the present invention;

FIG. 2 is a front elevation view of the conveyor of FIG. 1;

DETAILED DESCRIPTION OF THE PREFERRED EMBODIMENTS

Figure 5:
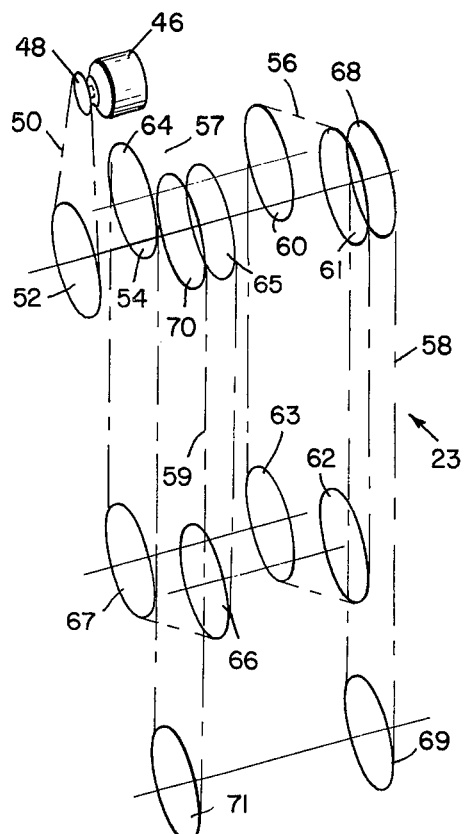
FIG. 5 is another diagrammatic showing in perspective of the drive apparatus and chain assembly of FIG. 4.
Figure 4:
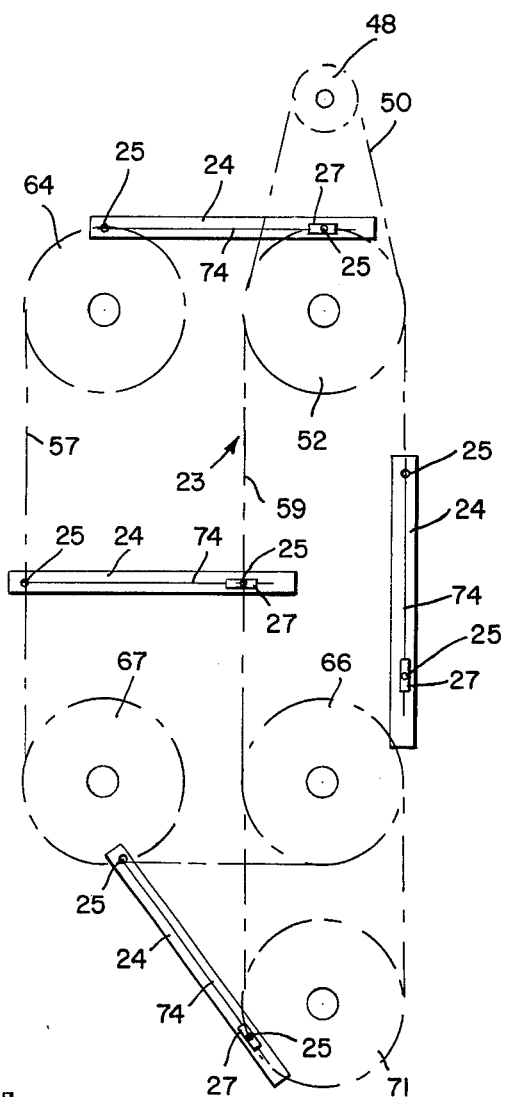
FIG. 4 is a diagrammatic showing of the drive apparatus and chain assembly of the conveyor of the present invention.
Figure 3:
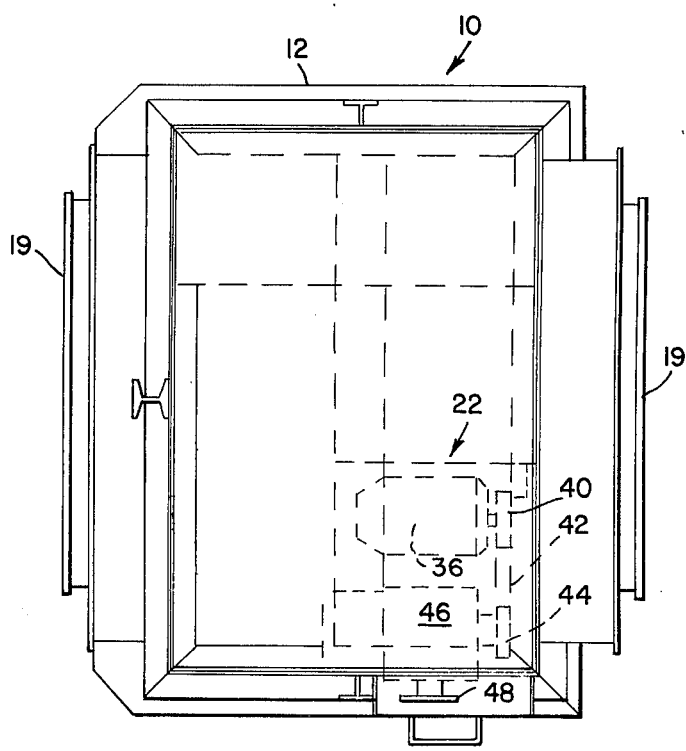
FIG. 3 is a plan view of the conveyor of FIG. 1.
Figure 6:
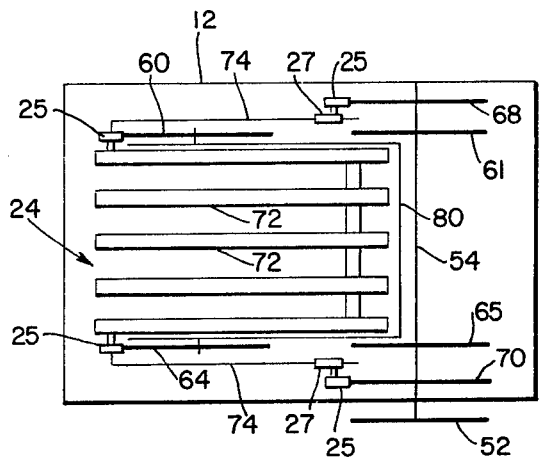
FIG. 6 is a diagrammatic plan view showing of the tray assembly and upper sprockets of the drive assembly.
Figure 7:
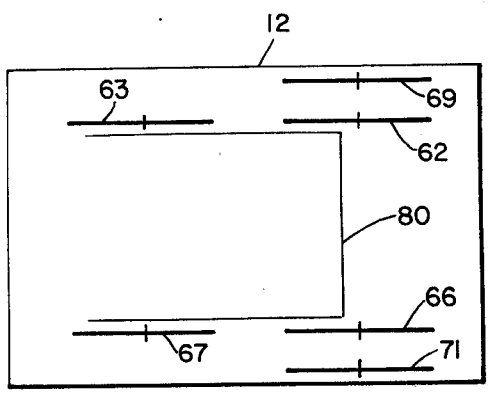
FIG. 7 is a diagrammatic plan view showing of the lower sprockets of the drive assembly.

Referring to the drawings, and as illustrated in FIGS. 1-3, the package conveyor 10 of the present invention includes a welded steel casing 12 which is positioned in a first platform 14, and passes through main deck 16 to first deck 18, as of a vessel (not shown). Doors 19 are provided for loading and unloading of cargo at platform 14 and deck 18, but the door (not shown) at deck 16 would be for unloading of cargo only. Numeral 22 generally designates a drive apparatus which drives chain assembly 23. Chain assembly 23 carries trays 24 secured thereto by chain attachments 25, and slide units 27. Control stations 28 with stop, start, up, and down direction control buttons are provided at each deck for controlling operation of drive apparatus 22. Top and bottom, fork assemblies 33 and 35 are positioned at the platform and first level 14 and 18, respectively, for loading and unloading cargo from conveyor 10.

Reference is now made to FIGS. 1-8. Drive apparatus 22 consists of an electric motor 36 positioned in the upper portion of casing 12 and suitably connected to electric power supply equipment (not shown), and control stations 28. Motor 36 has a pulley 40 mounted on its shaft for driving a belt 42 and pulley 44 positioned on the input shaft of a gearbox 46. A sprocket wheel 48 is mounted on the output shaft of gearbox 46. A chain 50 passes over sprocket 48, and a sprocket 52 mounted on a shaft 54. Also provided are a plurality of sprockets 60–71 within casing 12. Sprockets 61, 65, 68 and 70 are all mounted on shaft 54 for synchronous movement, and sprockets 60, 62, 63, 64, 66, 67, 69 and 71 are each mounted on an individual stub shaft (not shown).

Chain assembly 23 consists of four continuous chains 56–59. Chain 56, which is a load chain, passes around sprockets 60–63. Chain 57, which is also a load chain, passes around sprockets 64–67. Chain 58, which is a control chain, passes around sprockets 68 and 69. Chain 59, also a control chain, passes around sprockets 70 and 71.

Each tray 24 is a welded assembly, best shown in FIGS. 2, 4, 6, and 8, and consists of a plurality of parallel load support bars or fingers 72 open at each end in a fork type configuration. A pin 73 protrudes at right angles from each outside finger 72. Each outside finger 72 is wider than the other fingers, and carries a control or slide arm 74 secured at one end thereto as by a key 75. A cross bar or spine 77 is secured to the bottom of each of the support bars 72 and forms tray 24 into an integral unit.

Figure 9:
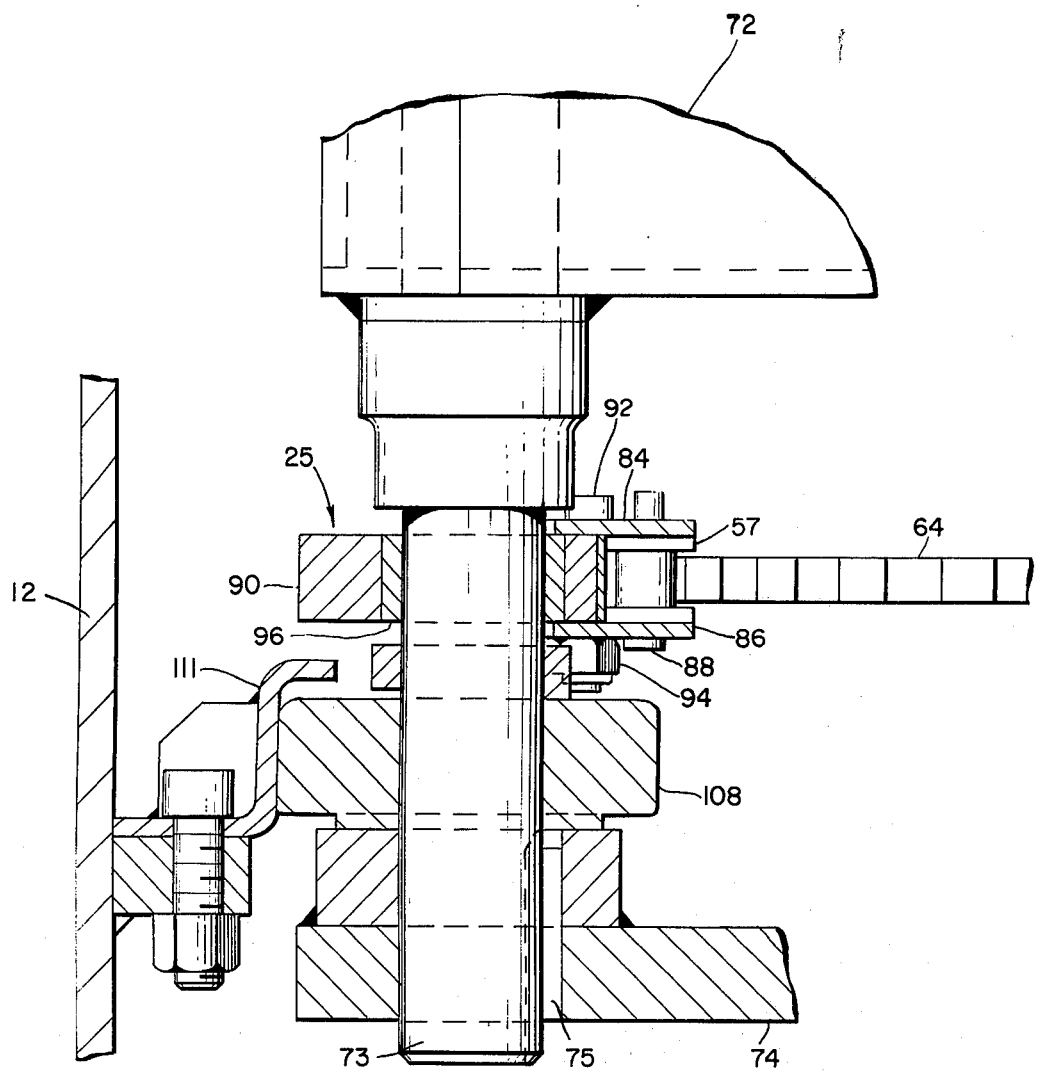
FIG. 9 is an enlarged portion of FIG. 8 showing mainly details of a chain attachment.

Reference is now made to FIG. 9. Chain attachments 25 each consist of a pair of plate members 84 and 86, each secured at one end to chain 57 by means of chain pins 88. A chain attachment block 90 is secured between members 84 and 86, as by bolt 92, and self locking nut 94, allowing block 90 to pivot thereabout. An opening through block 90 carries a bushing 96 which accommodates pin 73 carried by tray 24.

Figure 10:
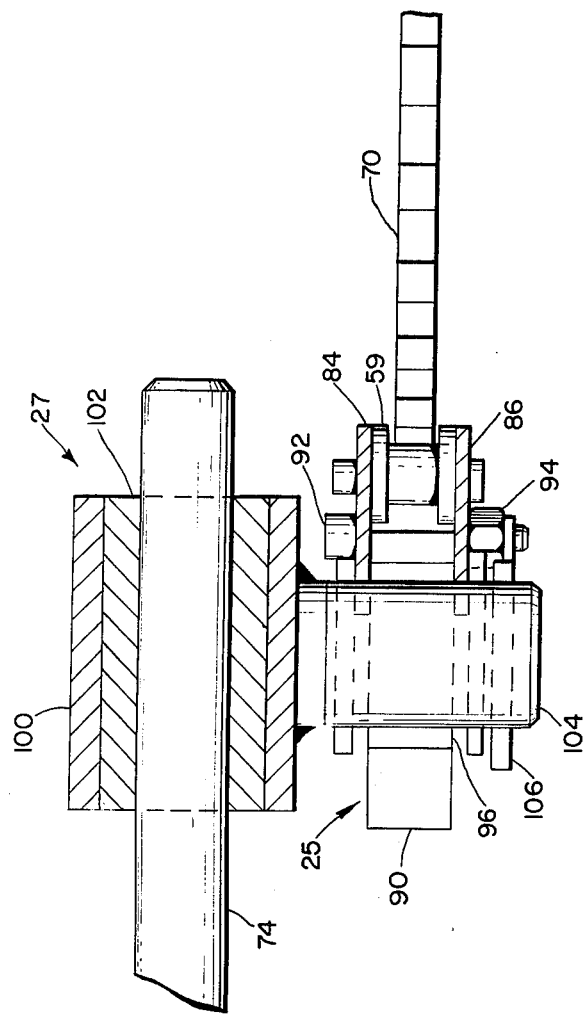
FIG. 10 is an enlarged portion of FIG. 8 showing details of a slide unit.

Reference is now made to FIG. 10 wherein the details of one of the slide units 27 are revealed. Each slide unit 27 consists of a tubular member 100 carrying a bushing insert 102 which slidingly accommodates control arm 74 of tray 24. A pin 104 attached to the outer surface of member 100, is rotatively positioned within bushing 96 of attachment block 90 of chain attachment 25. Pin 104 is maintained in bushing 96 as by circlip 106 carried around its end. Rotation between slide unit 27 and arm 74 is limited by the reaction set up between these two members, which prevents or frees chains 58 and 59 of lateral loading.

Figure 8:
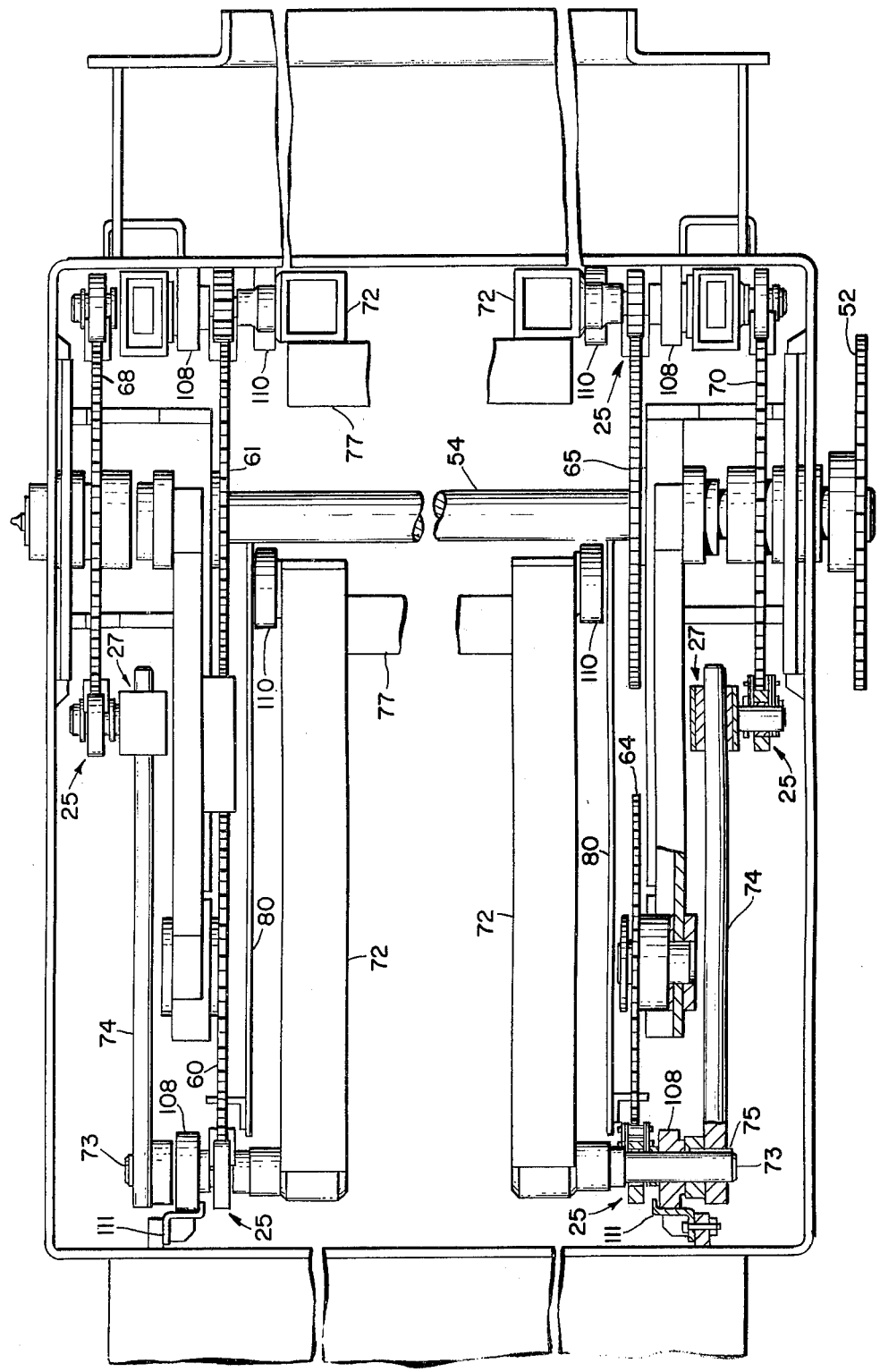
FIG. 8 is a partial cross section taken along the lines 8-8 of FIG. 1 showing details without the top fork and chain assemblies.

As illustrated in FIG. 8, trays 24 are also provided with rollers 108 which are positioned on pins 73 at opposite corners. On the other opposite corners of trays 24, a similar pair of rollers 110 are also provided. Rollers 108 and 110 serve to limit lateral movement of trays 24 when moving while positioned in the horizontal and vertical positions. No appreciable load exists on rollers 108 and 110. Rollers 108 rotate only when in contact with casing 12 or tray restraints 111 secured to the casing. Rollers 110 rotate when in contact with casing 12 or shield 80.

Shield 80 is a continuous U-shaped member, extending between upper sprockets 60, 61, 64 and 65 and lower sprockets 62, 63, 66 and 67, and serving to separate horizontally positioned moving trays 24 from chains 56 and 57 and vertically positioned moving trays 24. Shield 80 thus forms a continuous smooth surface around horizontally positioned trays to ensure freedom from obstruction to movement of cargo.

Figure 11:
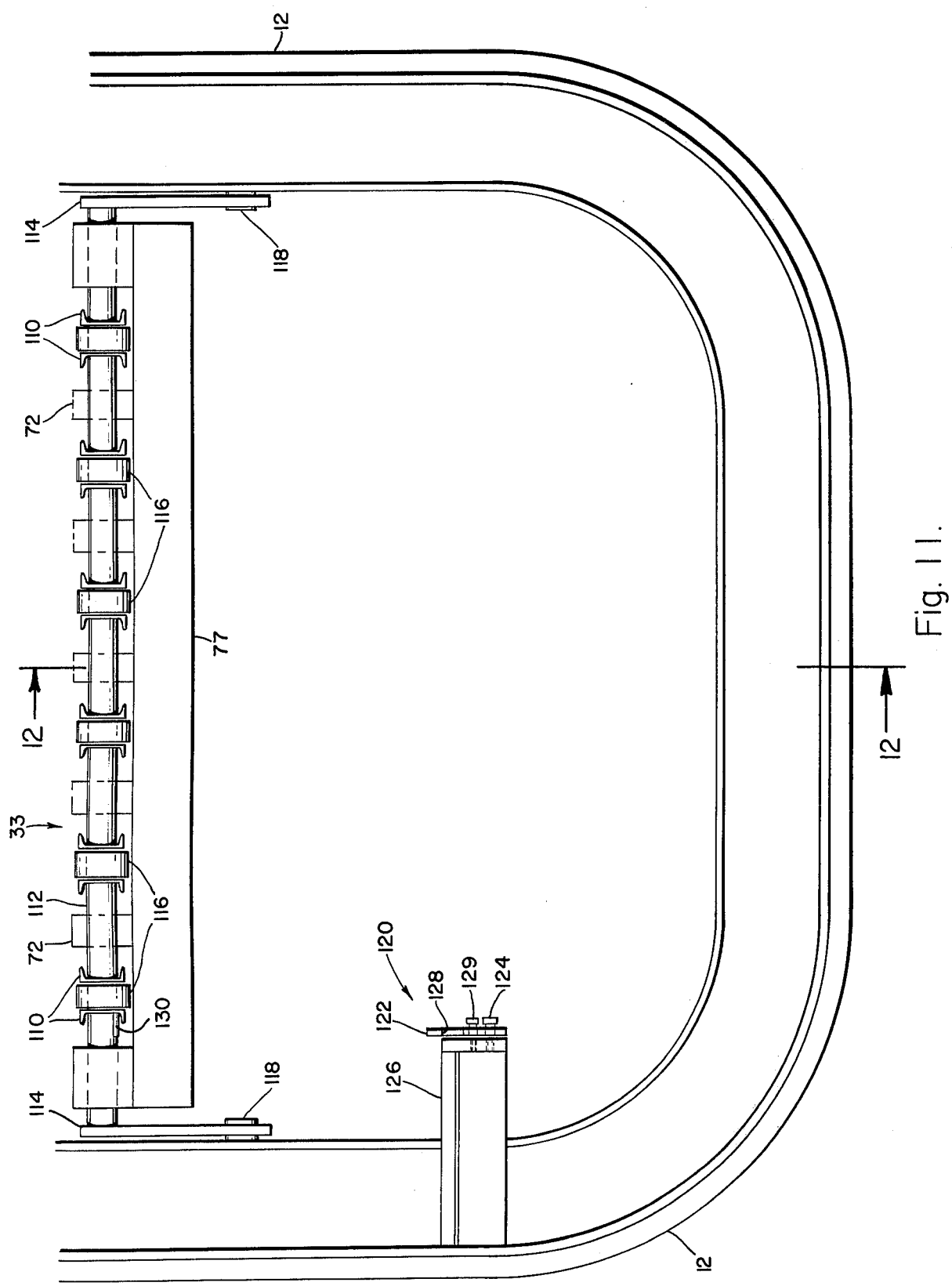
FIG. 11 is an elevation view of the upper fork and tray assemblies as seen through an open doorway of the casing.
Figure 12:
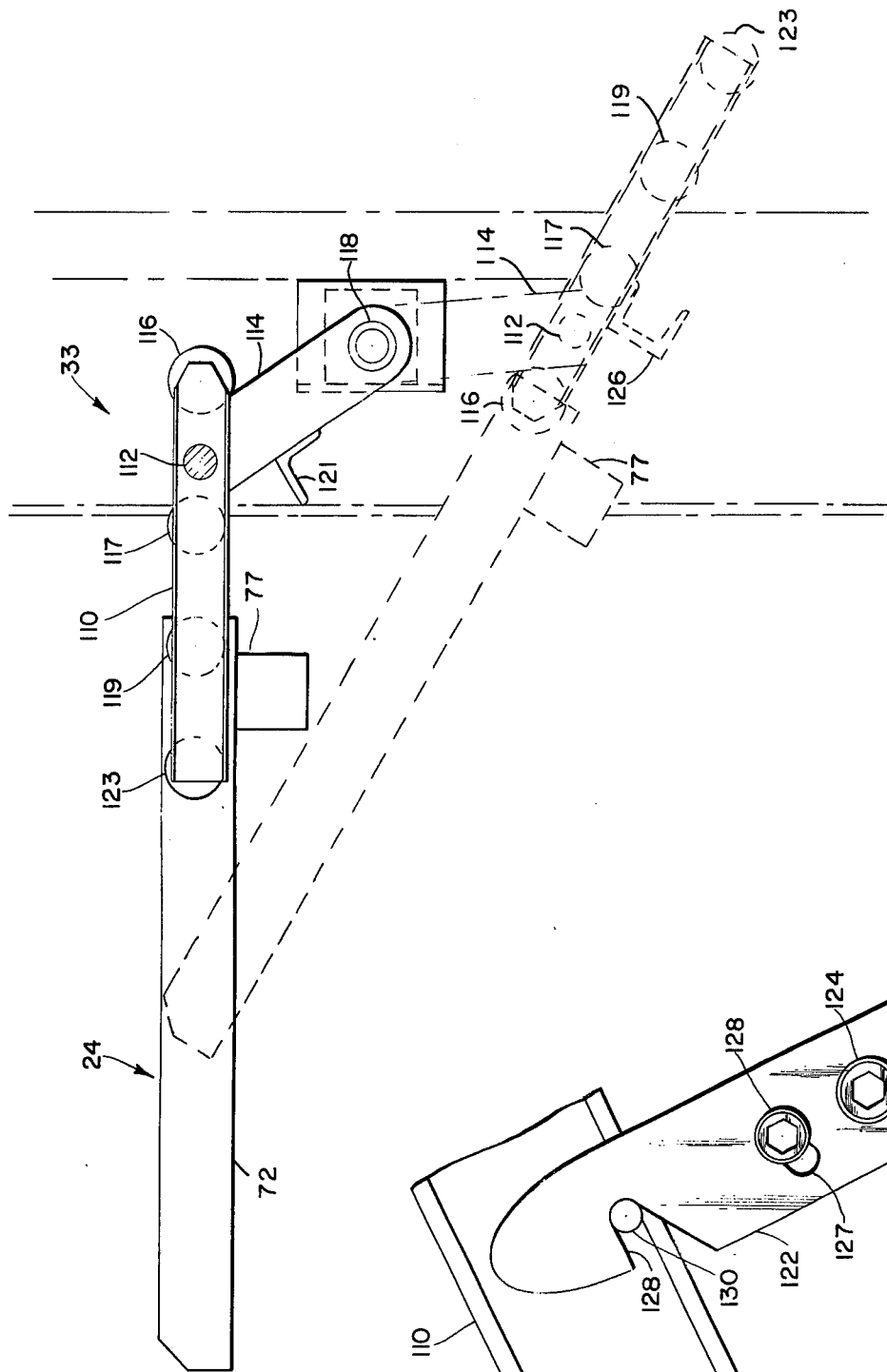
FIG. 12 is a cross-sectional view taken along the lines 12—12 of FIG. 11.

Reference is made to FIGS. 11–16. Top and bottom fork assemblies 33 and 35 are installed at first level 18 and first platform level 14, respectively, for loading and unloading of cargo. Assemblies 33 and 35 must be manually set to correct positions before a cargo transfer operation can be initiated. For strike-down operation, hereinafter to be more fully described, top fork assembly 33 must be horizontally positioned. FIG. 12, and bottom fork assembly 35, 30° up from horizontal, FIG. 15. For strike-up operation, hereinafter to be more fully described, bottom fork assembly 35 must be horizontally positioned, and top fork assembly 33, 30° up from horizontal.

Top fork assembly 33, best shown in FIGS. 11 and 12, is provided with a plurality of U-shaped members 110, secured in parallel pairs, as by welding to rod member 112. Rod member 112 is positioned through members 110 and is secured at each end to one of a pair of fork members 114. The longitudinal axis of rod 112 is substantially perpendicular to the center lines of members 110. A plurality of rows of rollers 116, 117, 119, and 123 are individually mounted for rotation intermediate the members 110 of each pair. The axes of rotation of rollers 116 are coincident and substantially perpendicular to the center lines of members 110. The diameters of rollers 116 are such that their surfaces protrude equidistantly beyond both the upper and lower surfaces and ends of members 110, best shown in FIG. 12. This enables cargo packages to run off rollers 116 and slide on members 110 for unloading when fork assembly 33 is positioned in the dashed line position of FIG. 12 as will hereinafter be more fully described. Rollers 117, 119, and 123 are smaller in diameter than rollers 116 and have their axes of rotation off-set from the center lines such that their surfaces protrude the same distance beyond the upper surfaces of members 110 as the surfaces of rollers 116, but do not protrude beyond the lower surfaces of members 112. Rollers 123 also extend beyond the other ends of members 112. Rollers 117, 119, and 123 are positioned below the surfaces of members 112 to provide for clearance of tray spine 77 when fork assembly 33 is in the load position, as illustrated. Merely as an example, helpful to the understanding of the invention, say the height of tray fingers 72 is two inches and the distance between the bottom surfaces of members 110 and the top of the rollers is 1⅝ inches. This dimensioning enables a tray 24 to pick up a cargo package with the leading edges of fingers 72, pull the package into the conveyor and lift the package clear of the fork 33. A clearance of one-eighth of an inch is thus maintained between the spine 77 and the bottom surfaces of members 110, allowing a quarter of an inch lift of the package.

It will be appreciated that all the rollers 116, 117, 119, and 123 could be positioned on members 110 to protrude above and below the top and bottom surfaces of these members. Merely as an example, rollers 116, 117, 119 and 123 could protrude one-eighth of an inch beyond the top and bottom surfaces of members 110, by using rollers having 1 ¾ inch diameters positioned on the center lines of members 110, which are 1 ½ inches in height. The heights of the fingers 72 would then be 2 ½ inches to provide a clear pick-up of one-half inch above the rollers while maintaining a quarter inch clearance between the spine 77 of tray 24 and the surfaces of rollers 116, 117, 119 and 123 protruding from the lower surfaces of members 110. With the rollers thus positioned to extend above and below the members 110, packages being unloaded in an unloading operation will roll off fork assembly 33 on the rollers instead of sliding off on members 110 as wherein rollers 117, 119 and 123 protrude only above the surfaces of members 110.

Each fork 114 is pivotally mounted on one of a pair of stub shafts 118, oppositely positioned on frame 12. Thus, the fork assembly 33 can be swung from the horizontal position to a 30 degree up position for unloading, and held in position by a lock mechanism 120. An angle iron member 121 secured to casing 12 holds fork assembly 33 in a horizontal position.

Figure 13:
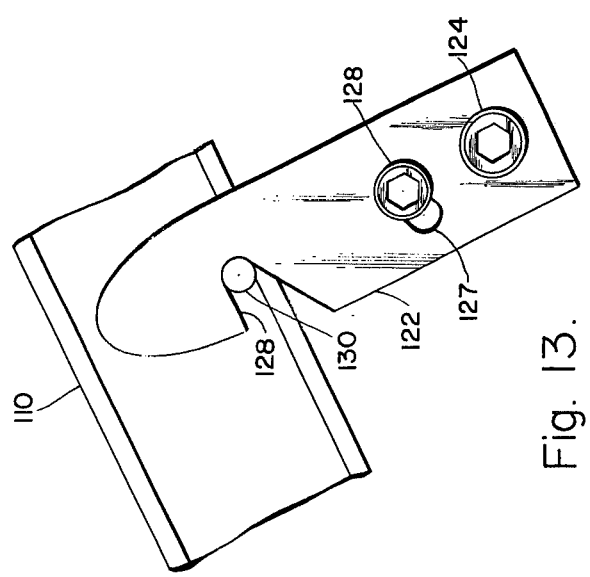
FIG. 13 is a side elevation view of the locking mechanism showing details.

Lock mechanism 120, best shown in FIG. 13, consists of a plate member 122, pivotally mounted, as by a screw 124 at one end to a member 126 that is attached to frame 12. Plate 122 has a notch 128 at the other end adapted to engage in locking position with a pin 130 carried by one outside U-shaped member 110. A slot, 127, formed in plate 122, has positioned therethrough a screw 129 which is positioned in member 126, allowing limited pivotal movement of plate 122 in either direction. Lock mechanism 120 prevents fork assembly 33 from jumping up during an unloading operation.

Figure 14:
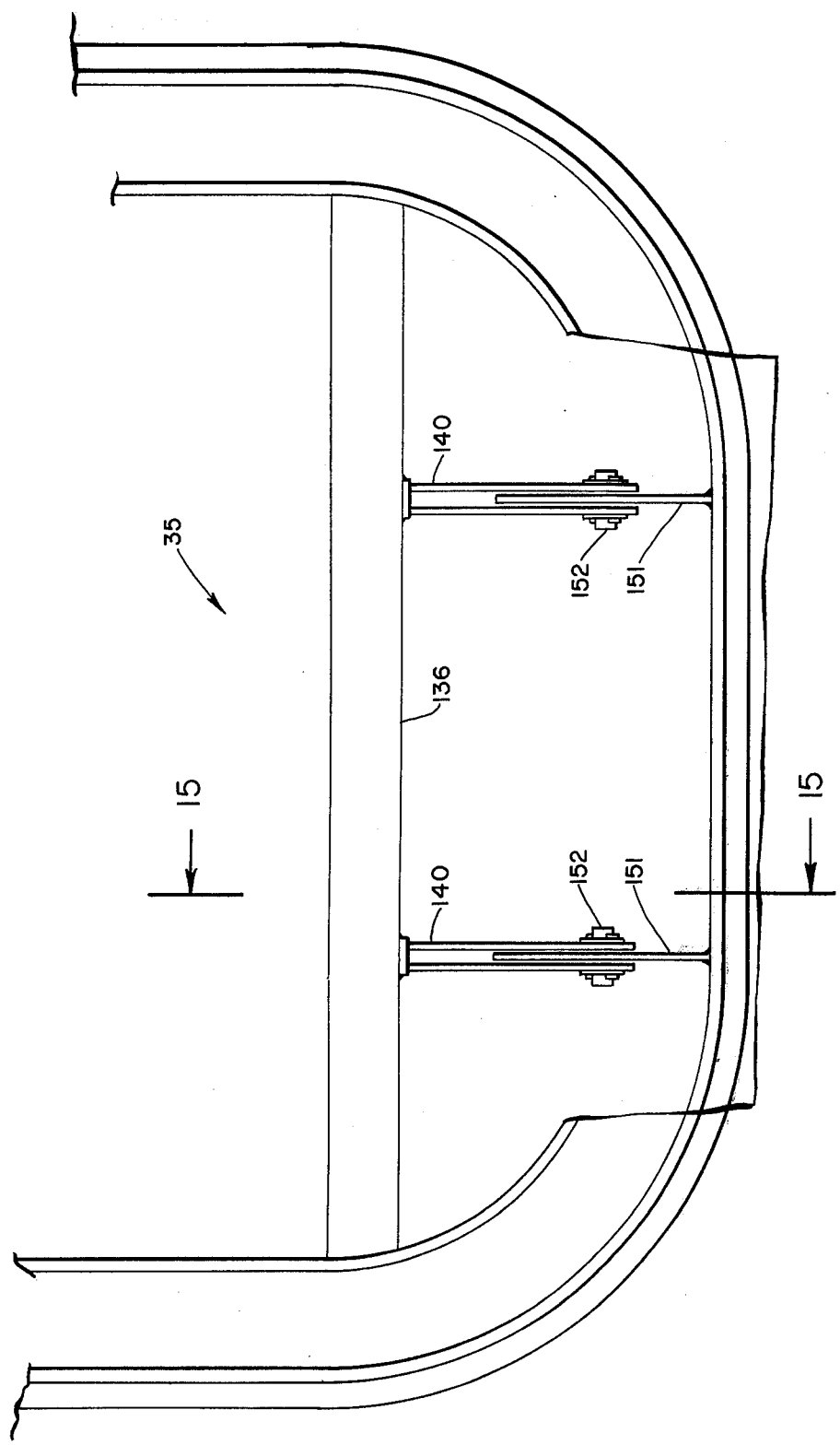
FIG. 14 is an elevation view of the lower fork assembly as seen through an open doorway of the casing.
Figure 15:
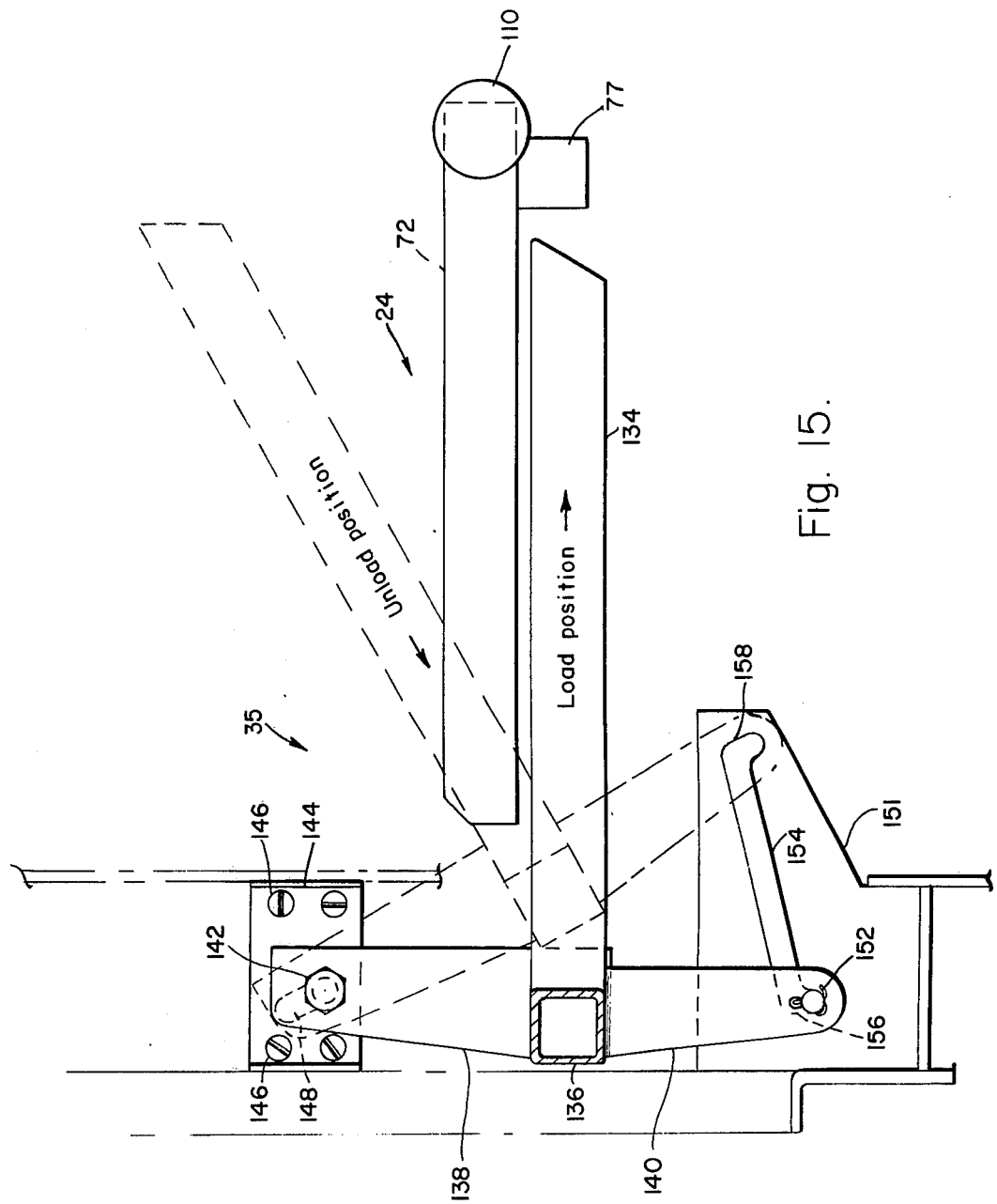
FIG. 15 is a cross section taken along the lines 15—15 of FIG. 14 showing details of the lower fork assembly.
Figure 16:
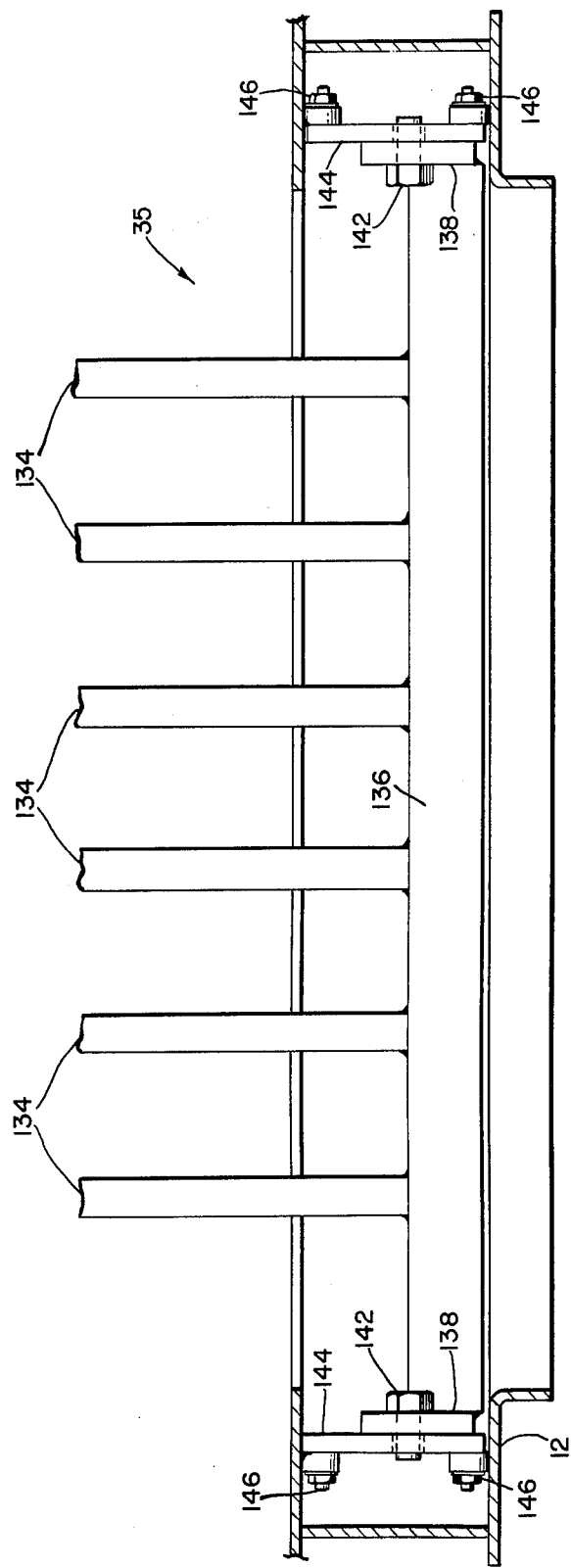
FIG. 16 is a plan view of the lower fork assembly.

Bottom fork 35 is a welded assembly, FIGS. 14–16, and consists of parallel bars 134, each of which is secured at one end to a transverse member 136. Member 136 carries parallel brackets 138, located one at each end, and generally extending in a direction perpendicular to the bars 134. Also carried by member 136 is a pair of parallel, U-shaped brackets 140, positioned intermediate the ends, and extending in a direction opposite to that of brackets 138.

Brackets 138 are provided with threaded holes which are adapted to accept threaded pins 142. Plate members 144 which are secured as by bolts 146 to the casing 12, are provided with slanted slots 148 for accepting the ends of pins 142 for pivotally mounting the fork assembly 35 at its top.

Brackets 140 each straddle a bracket 151, secured to the casing 12. Brackets 140 carry pins 152 slindingly engaging slots 154 provided in brackets 151. Fork assembly 35 can thus be positioned horizontally for strike-up operation by positioning the pins 152 in trough portions 156 of slots 154, or it can be swung upward 30° for strike-down (i.e. unloading) operation, by positioning the pins 152 in trough portions 158 located on the other ends of slots 154.

One mode of operating the conveyor 10 is to transfer packages from the first level 18 to the first platform level 14. A second operating mode is to strike-up packages from first platform 14 and deliver them to first level 18. A third mode of operation is the carrying of packages from first platform 14 to main deck 16. Whereas in the first two modes of operation, unloading is accomplished automatically by means of fork arrangements 33 and 35, packages must be manually unloaded at main deck 16 level in the third mode of operation.

More specifically, in the package strike-down from the first level 18 to the first platform 14 mode of operation, first level 16 and first platform level 14 doors 19 are fully open, and door 19 of main deck 16 is fully closed. Lower fork assembly 35 is manually positioned until it is locked 30° up. Upper fork assembly 33 is moved to the horizontal position. The "down" push button at a control station 28 is pressed and conveyor motor 36 is brought into operation. Power is transmitted by drive chain 50 to drive sprocket 52 on shaft 54 which drives the four sprockets 61, 65, 68 and 70. Since sprockets 61, 65, 68 and 70 are all keyed to drive shaft 54, the four chains 56, 57, 58 and 59 move in synchronism and carry trays 24 in a counterclockwise direction. Packages can now be fed into conveyor 10 at the first level 18 by means of the horizontally positioned fork assembly 33. Trays 24 travel upward to the first level 18 in a vertical position and then assume a horizontal position when level with fork assembly 33. At this point in time a package is pushed over rollers 116 on fork assembly 33 and on to tray 24 which is level with and just inboard of the fork assembly 33. When next tray 24 reaches the same position, another package is loaded on it in the same manner. Loaded trays 24 travel downward to first platform 14 and the packages slide off the bottom fork assembly 35, which is tilted 30° up, and through door 19 opening. In doing so support bars 72 of trays 24 pass downward between the bars 134 of fork assembly 35, which catch the packages. Each package is discharged through the first platform 14 door 19 opening, onto a conveyor (not shown), and empty tray 24 continues downward to the bottom portion of drive apparatus 23. At this point tray 24 pivots through 90°. Each tray 24 then travels back up to the first level 18 in a vertical position.

During the period that a tray 24 translates from the horizontal to the vertical, or the vertical to the horizontal positions, sliding motion between control chain slide units 76 and control arms 78 of trays 24 compensate for the shortening or lengthening of the spacings between chain attachments 72 connecting trays 24 to load chains 56 and 57, and chain attachments 72 connecting trays 24 to load chains 58 and 59.

Thus, it will be appreciated that any distortion to casing 12 or misalignment of any of the upper or lower sprockets will not affect the free movement of trays 24. Self-alignment is provided because trays 24 are not constrained by tracks to move in a predetermined path. Also, jamming at the first or platform levels 14 and 18 is eliminated by the sliding motion that exists between pivoted slide units 76 on control chains 58 and 59 carrying control arms 78. This compensates for any mislignment or chain adjustment that has been made.

In the package strike-up from the first platform 14 to the first level 18 mode of operation, the first level 18 and first platform 14 doors 19 are fully opened and the main deck 16 door 19 is fully closed. Upper fork assembly 33 is manually positioned until it is locked in a 30° up position. Lower fork assembly 35 is moved to the horizontal position. In this mode of operation the "up" push button on controller 28 is pressed, and motor 36 is brought into operation. Packages are now fed on to the conveyor at the first platform level 14 by means of horizontally positioned bottom fork assembly 35. The operating cycle is similar to that previously described, except that trays 24 are carried around in the opposite or clockwise direction, and loaded at the opening of door 19 at first platform 14. This time the bars 72 of trays 24 pass upward between bars 134 of fork assembly 35 to pick up packages. After travelling upward in the horizontal position and over the top of the drive apparatus 23, packages are unloaded at the first level 18. Top fork assembly 33 is positioned in a 30° up position, so that each package is picked up by the fork assembly 33 and slides off the rollers 16 on the fork assembly. Beyond this point trays 24 are turned to the vertical position and continue their downward travel to the bottom part of the drive apparatus 23. Each tray 24 pivots through 90 degrees so that it is in the horizontal position ready to receive the next package at the first platform 14 door 19 opening.

In the package strike-up from the first platform 14 to the main deck 16 mode of operation, the first platform 14 and main deck 16 doors 19 are fully open, and the first level 18 door 19 fully closed. The lower fork assembly 35 is moved to the horizontal position for loading. Since there is no fork assembly at the main deck 16 location, the packages must be unloaded manually. When ready to transfer packages, the up push button on the controller 28 is pressed at either the first platform 14 or main deck 16. The tray assemblies 24 begin to move upward. As trays 24 reach the main deck 16 level, the stop push button on control 28 is pressed to stop motor 36 and the package is then unloaded from the trays.

During the period in which trays 24 ascend or descend in the horizontal position their movement is restricted by chains 56–59 and the four rollers 108 and 110 positioned at the corners of each tray, thus no track is required.

Shaft 54 has been illustrated as a one piece shaft, but could be split into three portions, flexibly secured to each other in axial alignent, which would further compensate for misalignment between the upper and lower sprockets. One end shaft portion would have the sprockets 52, 65 and 70 secured thereon, and the other end shaft portion would have sprockets 60 and 61 secured thereon, all the sprockets being positioned in spaced relationship with respect to each other, as illustrated positioned on shaft 54. The intermediate shaft portion would have secured thereon at each end, a circular flange. A plurality of bushings, fashioned from flexible material, would be inserted in circularly arranged openings through each flange, and carry the heads of fastening screws, which would be threadedly engaged with sprockets 61 and 65. The bushings would each have portions extending beyond their respective flange openings, intermediate the sprockets 61 and 65, and the respective opposing flanges thus providing flexible, spaced coupling therebetween.

While a specific embodiment of the invention has been illustrated and described, it is to be understood that it is provided by way of example only and the invention is not to be construed as being limited thereto, but only by the proper scope of the following claims.

What we claim is:

1. A package conveyor comprising:
   a casing;
   a package carring, non-articulated, rigid tray;
   a pair of spaced endless control chains mounted adjacent opposite walls of said casing;
   a pair of spaced endless load chains mounted within said casing intermediate said endless control chains;
   drive means, including chain sprocket members, interconnecting said control and load chains for rotating said chains in synchronism; and
   means connecting said tray to points on said chains for maintaining said tray in substantially horizontal and vertical positions with respect to said chains during portions of tray travel while compensating for changes in spacing between the points during movement from one position to the other, one of said tray connecting means including means securing said tray to said chains for relative pivotal movement and the other of said tray connecting means including means securing said tray to said chains for relative pivotal and sliding movement.

2. The package conveyor of claim 1 wherein said drive means comprises:
   first and second pairs of vertically spaced sprockets, each pair of sprockets carrying one of said control chains, the lower sprocket of each pair of sprockets being mounted for independent rotation;
   third and fourth pairs of vertically spaced sprockets carrying one of said load chains, the lower sprocket of said third pair of sprockets and the sprockets of said fourth pair of sprockets all being mounted for independent movement;
   fifth and sixth pairs of vertically spaced sprockets carrying the other of said load chains, the lower sprocket of said fifth pair of sprockets and the sprockets of said sixth pair of sprockets all being mounted for independent rotation;
   a shaft operatively mounted for rotation in said casing and carrying the upper sprockets of said first, second, third and fifth pairs of sprockets; and
   a motor operatively connected to said shaft for rotating said upper sprockets.

3. A package conveyor comprising:
   a casing;
   a package carrying tray;
   a pair of spaced endless control chains mounted adjacent opposite walls of said casing;
   a pair of spaced endless load chains mounted within said casing intermediate said endless control chains;
   drive means, including chain sprocket members, interconnecting said control and load chains for rotating said chains in synchronism; and
   means connecting said tray to points on said chains for maintaining said tray in substantially horizontal and vertical positions with respect to said chains during portions of tray travel while compensating for changes in spacing between the points during movement from one position to the other;
   said tray connection means comprising;
      a pair of pin members each secured on an opposite side of one end of said tray;
      means securing each of said pin members to a point on a respective one of said load chains for pivotal movement; and
      means securing each of said pin members to a point on a respective one of said control chains for rotative and translative movement.

4. The package conveyor of claim 3 wherein said rotative and translative movement securing means comprises:
   a pair of control arms each secured to one of said pin members at an end;
   a pair of slide members each in sliding engagement with one of said control arms; and
   means securing each of said slide members to a point on one of said control chains for pivotal movement.

5. The package conveyor of claim 1 further comprising:
   package handling means pivotally secured to the upper portion of said casing, said package handling means being cooperably positioned in substantially horizontal and angled positions with respect to said tray for loading and unloading packages, respectively, during tray travel.

6. The package conveyor of claim 5 further comprising:
   means carried by said casing and cooperable to lock said package handling means in the angled position.

7. The package conveyor of claim 1 further comprising:
   package handling means pivotally secured to the lower portion of said casing, said package handling means being cooperably positionable in substantially horizontal and angled positions with respect to said tray for loading and unloading packages, respectively, during tray travel.

8. A package conveyor comprising:
   a casing;
   a package carrying tray;
   a pair of spaced endless control chains mounted adjacent opposite walls of said casing;
   a pair of spaced endless load chains mounted within said casing intermediate said endless control chains;
   first and second pairs of vertically spaced sprockets, each pair of sprockets carrying one of said control chains, the lower sprocket of each pair of sprockets being mounted for independent rotation;
   third and fourth pairs of vertically spaced sprockets carrying one of said load chains, the lower sprocket of said third pair of sprockets and the sprockets of said fourth pair of sprockets all being mounted for independent movement;
   fifth and sixth pairs of vertically spaced sprockets carrying the other of said load chains, the lower sprocket of said fifth pair of sprockets and the sprockets of said sixth pair or sprockets all being mounted for independent rotation;

a shaft operatively mounted for rotation in said casing and carrying the upper sprockets of said first, second, third and fifth pairs of sprockets;

a motor operatively connected to said shaft for rotating said upper sprockets;

a pair of pin members each on an opposite side of one end of said tray and secured to a point on one of said load chains for pivotal movement;

a pair of control arms each secured to one of said pin membbers at an end;

a pair of slide members each in sliding engagement with one of said control arms; and means securing each of said slide members to a point on one of said control chains for pivotal movement.

9. A package conveyor comprising:

a casing;

a tray for carrying packages;

a first pair of spaced endless chains;

means mounting said fist pair of chains for movement within said casing;

a second pair of spaced endless chains;

means mounting said second pair of chains for movement in said casing adjacent said first pair of chains;

drive means connected to said first and second pairs of chains for rotating said chains in synchronism;

first securing means securing one end of said tray to said first pair of chains for pivotal movement relative thereto;

second securing means securing another end of said tray to said second pair of chains for pivotal movement relative thereto, said first and second pairs of chains defining different paths of travel such that said tray travels on said first and second pairs of chains between horizontal and vertical positions while connected to said first and second pairs of chains, said first and second securing means being arranged to continuously maintain said ends of said tray pivotally secured to both of said pairs of chains during movement of said tray on said first and second pairs of chains, said paths of said first and second pairs of chains being arranged such that the relative spacing between said first and second pivotal securing means tends to change as said tray, while connected to said first and second pairs of chains, travels between said vertical and horizontal positions;

one of said first and second securing means comprising a slidable connection permitting relative sliding movement between said tray and the pair of chain means associated with said one mounting means, while maintaining said continuous pivotal securement therebetween, to compensate for said changes in spacing.

* * * * *